(12) United States Patent
Bortolussi

(10) Patent No.: US 7,571,567 B2
(45) Date of Patent: Aug. 11, 2009

(54) RESILIENTLY COMPENSATED WIRE TENSIONER PARTICULARLY FOR USE IN THE FIELD OF VINE GROWING

(75) Inventor: Claudio Bortolussi, Fiume Veneto (IT)

(73) Assignee: Mollificio Bortolussi S.R.L., Pordenone (IT)

( * ) Notice: Subject to any disclaimer, the term of this patent is extended or adjusted under 35 U.S.C. 154(b) by 0 days.

(21) Appl. No.: 10/590,145

(22) PCT Filed: Nov. 23, 2004

(86) PCT No.: PCT/IB2004/003852

§ 371 (c)(1),
(2), (4) Date: Mar. 21, 2007

(87) PCT Pub. No.: WO2005/048691

PCT Pub. Date: Jun. 2, 2005

(65) Prior Publication Data

US 2007/0173132 A1    Jul. 26, 2007

(30) Foreign Application Priority Data

Nov. 24, 2003  (IT) .............................. PN03A0082

(51) Int. Cl.
*A01G 17/04*  (2006.01)
(52) U.S. Cl. .............................................. 47/46; 47/47
(58) Field of Classification Search ...................... 47/42, 47/44, 46, 47, 32.5, 70, 45; 256/37, 39, 40, 256/44; 254/213
See application file for complete search history.

(56) References Cited

U.S. PATENT DOCUMENTS

| 2,306,661 | A | * | 12/1942 | Gengler | ........................ 256/10 |
| 3,391,492 | A |   | 7/1968 | Attruia | |
| 3,949,968 | A | * | 4/1976 | Verhelst | ...................... 254/213 |
| 4,040,604 | A | * | 8/1977 | Langlie et al. | ................. 256/10 |
| 4,433,831 | A |   | 2/1984 | Bunger | |
| 2002/0112400 | A1 |   | 8/2002 | Fidler | |

FOREIGN PATENT DOCUMENTS

CH            685 187 A5    4/1995

* cited by examiner

*Primary Examiner*—Trinh T. Nguyen
(74) *Attorney, Agent, or Firm*—Wenderoth, Lind & Ponack, L.L.P.

(57) ABSTRACT

Resiliently compensated wire tensioner which can be used especially in the field of vine growing to tension "moving wires" of vine supports. It comprises a wire tensioner, a suitable helical spring located between a first hooking member capable of securing it to a corresponding end post of a support for vines or other plants and a second hooking member suitable for securing it to a winding member to which the ends of the pair of "moving wires" normally used in the construction of the supports are secured and which when suitably operated in rotation by a suitable tool causes winding and consequent tensioning of the same, the helical spring having turns at some distance from each other, so that it can be operated under compression and the corresponding first hooking member and the second hooking member being applied thereto in such a way as to stress it only by shortening; a suitable immobilizing member capable of securing the winding member in the appropriate tensioning position being also provided.

6 Claims, 1 Drawing Sheet

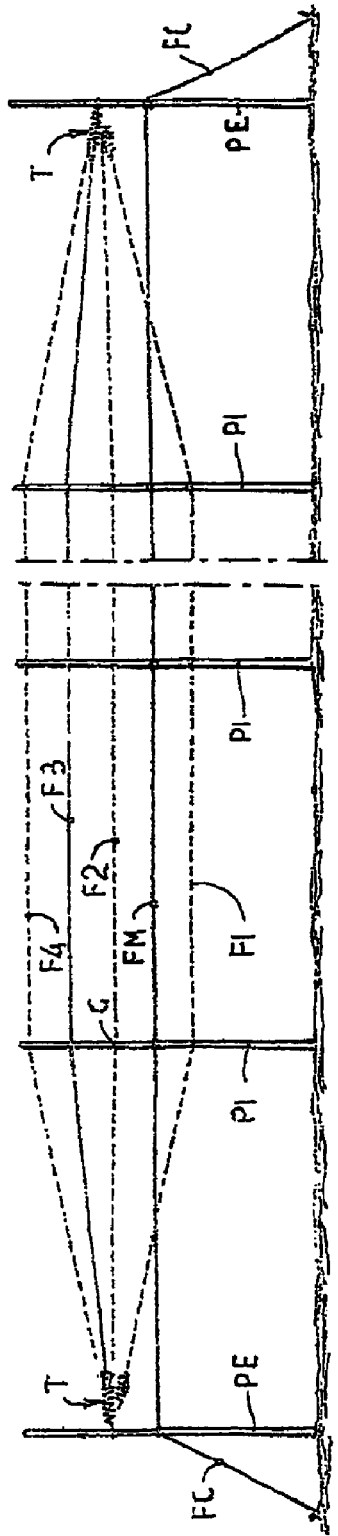
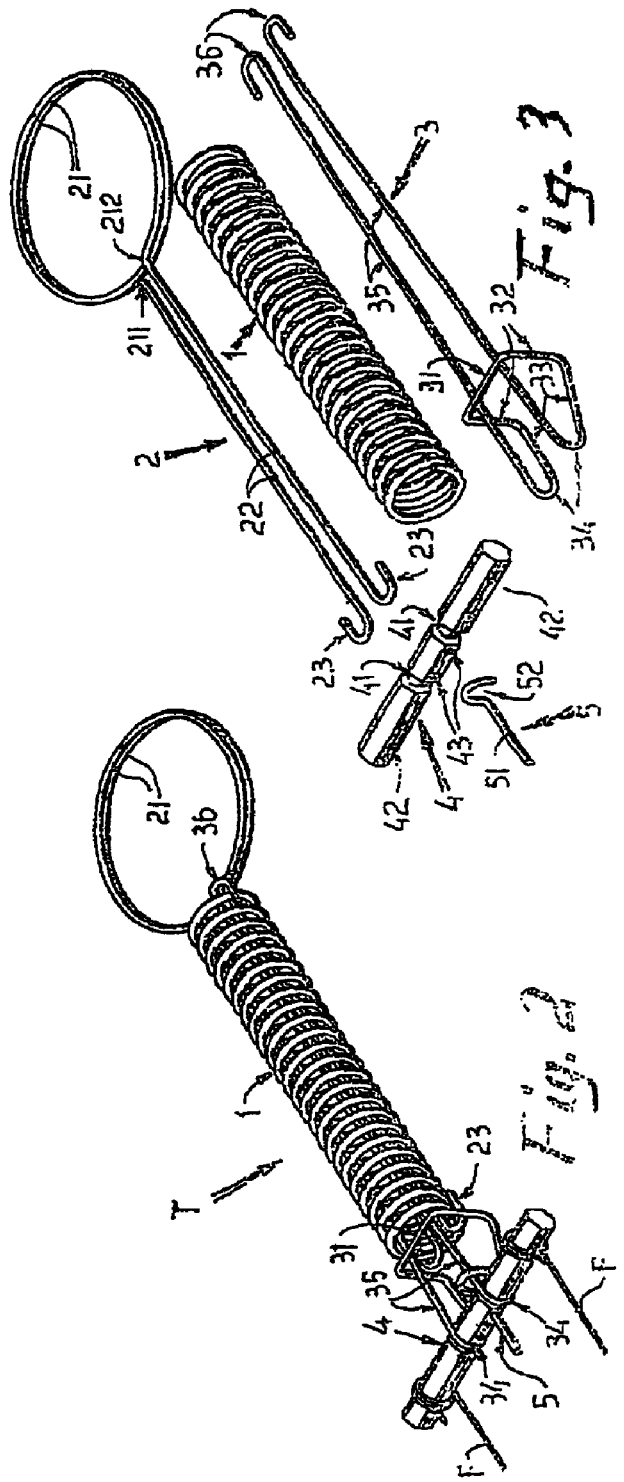

RESILIENTLY COMPENSATED WIRE TENSIONER PARTICULARLY FOR USE IN THE FIELD OF VINE GROWING

FIELD OF THE INVENTION

This invention relates to a particular device which can be used to tension wires in general and in particular the so-called "moving metal wires" also known as "containment wires" used in various types of structures normally used in the layering of vines and in some cases also layering in the cultivation of other fruits. In addition to comprising suitable elements designed to produce the desired tensioning in the wires to which it is applied, the device also comprises a suitable resilient member which is subjected to compression stress.

BACKGROUND OF THE INVENTION

As is known, various types of structures to support vines, which are normally arranged in rows and suitably spaced apart, have been produced to form training supports, especially in the field of vine growing.

The structures of the supports essentially comprise rows of suitable posts set vertically in the ground and suitably spaced in line with each other, the parts that project above the soil being interconnected by a number of horizontal wires to support the shoots which attach themselves or are attached thereto in various ways by various means.

The arrangement of such structures has progressively evolved giving rise to a variety of configurations which clearly depend on a number of factors such as the type of vine or other fruit which it is desired to grow, the manual and mechanized operations which it is intended to carry out, etc.

The materials used have also progressively evolved, and in fact the posts, which were initially obtained from suitable pieces of wood, have now been almost entirely replaced by cement or metal components having cross-sections of various shapes often comprising suitable members for the attachment of horizontal wires. Also the wires which are stretched between the aforesaid posts, which, as is well known, used to comprise zinc-coated iron wires, have been replaced by stainless steel wires or metal wires obtained using special technologies.

In the arrangement, which is currently the most widespread in the field of vine growing, the support structure always comprises a plurality of equally spaced posts in line with each other, which are interconnected by a fixed horizontal wire known as the "supporting wire", or also the "training wire", which is fixed to the posts at a suitable height above the surface of the ground. At least one pair of wires, which are parallel to each other and positioned on corresponding sides of the supporting structure in question, and which in the specific field are commonly referred to as "containment wires" or also "moving wires" because, as is known, they are positioned at various heights above the ground during the various stages of cultivation, which take place throughout the year, are also attached to two posts located at the ends of each row. Initially these "moving wires" were fixed at least one of their ends to a corresponding post at a corresponding end of the corresponding row using attachment members provided with a suitable hooking member or suitable clamps referred to as "wire clamps".

As a result, in order to carry out each individual movement, they first had to be slackened off, and then, when slackened off, positioned where necessary and finally retensioned. This procedure is complex and tiresome, requiring the employment of at least two persons and substantial working times, with consequent costs which are obviously appreciable.

In order to overcome these disadvantages and simplify the whole procedure, it has recently been the practice to place a helical spring working under tension between at least one of the ends of the "moving wires" and the corresponding 'post to which that end is fixed. However, this arrangement in turn brings about not insubstantial disadvantages, because the maximum strength of the tension spring used must, for obvious reasons, be substantially less than that used when handling the moving wire. A result, when high random loads act even for very short periods, such as those caused by the thrust of the wind ("sail' effect) or the action of mechanical operations or those deriving from random impacts caused involuntarily through the incorrect maneuvering of various machines {tractors-weeders, mechanical harvesters, etc.), among others, the aforesaid spring is overstretched, and being therefore permanently deformed has to be replaced. Given the random nature of the causes which might produce permanent damage to the spring, the necessary replacements of the same are obviously virtually unquantifiable and in any event numerous, as a result of which, the consequent costs for maintaining an efficient supporting structure are also unquantifiable, but obviously always high.

SUMMARY OF THE INVENTION

The object of this invention is to overcome the abovementioned disadvantages and this is achieved through a resiliently compensated wire tensioner. A resilient wire tensioner for tensioning wires of vine supports, the vine supports including a post, said resiliently wire tensioner comprising a first hooking member configured to be secured to the post of the vine supports; a second hooking member having slots; a helical spring extending in a longitudinal direction and located between said first hooking member and said second hooking member; a winding member configured to be rotatably received by said slots, said winding member extending transversally relative to the longitudinal direction of said helical spring and further configured to enable adjustable tensioning of the wires of the vine supports; and an immobilizing member configured to couple to said winding member and said second hooking member to prevent rotation of said winding member which is the object of this invention and which is described in detail in a preferred embodiment purely by way of example and without limitation with reference to the appended drawing in which.

BRIEF DESCRIPTION OF DRAWINGS

FIG. 1 illustrates a generic vine support in side view with the application thereto of the resiliently compensated wire tensioner to which this invention relates, FIG. 2 illustrates a perspective view of the particular conformation and construction of the entire device comprising the resiliently compensated wire tensioner which is illustrated purely generically and diagrammatically in FIG. 1, and FIG. 3 illustrates in detail a perspective view equivalent to that in FIG. 2 of the particular conformation of the individual elements comprising the device illustrated as a whole in that figure.

DETAILED DESCRIPTION OF THE INVENTION

It is pointed out that common details will be indicated using the same reference numbers.

With reference to FIG. 1, it is noted that the resiliently compensated wire tensioner T is first applied to a vine supporting structure constructed in one of the possible various known conformations. As may be clearly seen from FIG. 1, the supporting structure illustrated essentially comprises a plurality of posts positioned in line and suitably spaced apart. As is known, these posts may comprise suitable wooden or cement or even metal members with a variety of transverse cross-sections and are often provided with elements and/or devices for hooking metal wires to them. For clarity, the posts standing at the extremities of the supporting structure are identified by the reference PE and the intermediate posts by the reference PI. A fixed wire FM known as the "supporting wire" or "training wire" is attached to all the aforesaid posts PE and PI at a suitable height above the ground, and the end posts PE are suitably braced with suitable bracing wires FC. Corresponding wire tensioners with elastic resilience T are also attached to the two end posts PE at a suitable distance from the ground (in the example arrangement to which reference is made in a position somewhat above that at which the aforesaid "supporting wire" FM is attached) and the free ends of these are in turn connected to the two corresponding ends of a pair of "moving wires" F. Given the resilience of the aforesaid resiliently compensated wire tensioner T these moving wires F can be secured by simple hooking operations to suitable hooking members G provided in or attached to corresponding intermediate post PI in order to be positioned at different heights above the ground. A numerical symbol is added to the 'common reference F to indicate the various possible positions of the moving wires F, but only one position, that identified by F3, is indicated by an unbroken line while the others, specifically the two lower positions and the one above that position (F3) identified by F1, F2 and F4 respectively, are indicated by dashed lines.

It is pointed out that in the embodiment of the vine support to which reference is made it is indicated that two "resiliently compensated wire tensioners" T are fitted to the corresponding two extremities of the pair of moving wires F. It is clear that especially in the case of supports of limited length, and in any event depending upon the functional characteristics of such "resiliently compensated wire tensioners" T, a single element T may be used and attached to just one extremity of the said pair of wires F.

Now that the description of the attachment of the device in question ("resiliently compensated wire tensioner") T to a generic vine support has been described, the composition, conformation and functioning of the same (T) will now be described in detail with reference to FIGS. 2 and 3. As may be seen particularly clearly, especially from FIG. 3, it will be noted that the entire resiliently compensated wire tensioner T comprises only five elements of which four can be easily produced from suitable round bars or wires of suitable steel through bending operations, and one of which can instead be obtained from a suitable metal drawn section through drilling and turning operations.

Essentially the constituent components are: a helical spring 1, a first hooking member 2 for attaching the device T to a corresponding end post PE of a vine support (see FIG. 1), a second hooking member 3 for supporting a suitable component 4 for winding the moving wires F of a vine support (see FIG. 1) and finally a securing hook 5 to fix winding component 4 in an operating position.

Then making reference first to FIG. 3 and then to FIG. 2, the composition, conformation, mutual interconnection and particular function of the individual components referred to above will be described in greater detail. Helical spring 1 is obtained in a known way from a suitable round bar or suitable steel, and since it will be stressed in compression when in operation, it is shaped in such a way that its turns are set apart from each other by a certain amount in order to allow suitable shortening when placed under load. The first hooking member 2 comprises a suitable piece of steel (or other suitable metal) wire which is wound centrally to form two turns 21 with a suitable diameter to permit attachment to a corresponding end post PE for a line support corresponding to the resulting device T. At the extremities 211 and 212 of these two turns 21, as may be clearly seen in FIG. 3, the extremities (211-212) are slightly spaced apart, the steel wire is radially bent back externally in such a way as to form two straight lengths 22, which-are substantially parallel to each other and coplanar with the aforesaid two turns 21. These straight lengths 22 terminate at their free extremities into two short sections then outwards in the same plane to form corresponding curved members 23 substantially in a "hook" shape, which as will be described below will be hooked onto the final turn at one end of helical spring 1. It is pointed out 'that the length of the aforesaid two straight lengths. 22 will be suitably slightly greater than the length of helical spring 1.

Similarly to first hooking member 2, second hooking member 3 comprises a suitable length of steel (or other suitable metal) wire which is bent centrally in order to form a first straight length 31 which is a little longer than the diameter of said helical spring 1. Two short straight lateral lengths 32 depart from the extremity of first straight length 31 at right angles, from the extremities of which two further straight lengths 33 of a particular length (approximately twice the diameter of helical spring 1) depart again at right angles but slightly converging with each other. These straight lengths 33 are finally attached by two semi-circular lengths 34 to further corresponding two straight lengths 35 extending in the same plane and substantially parallel to each other, passing through the space between the first straight length 31 and the corresponding lateral lengths 32. These straight lengths 35 extend beyond the area defined by the first straight length 31 for a distance which is slightly longer than helical spring 1 and terminate at their free extremities in two short lengths which are bent outwards in the same plane to form corresponding curved members 36 of a substantially "hook" shape, which are wholly identical to corresponding curved members 23 of first hooking member 2, and which as described below will hook onto the terminal turn of helical spring 1 at the end opposite to that at which the aforesaid curved members. 23 of first hooking member 2 are hooked.

As may be clearly seen in particular from FIG. 3, winding member 4 comprises a single length of a section having a hexagonal cross-section which is obtained by cutting this portion off from a corresponding bar. The winding member has a length equal to approximately a little more than three times the diameter of helical spring 1 and in its central part there are provided two annular grooves 41 spaced apart by as much as semicircular lengths 34 and shaped and dimensioned in such a way as to allow the latter (34) to penetrate the former (41). Close to the lateral extremities of the length of section forming this winding member 4, close to grooves 41, there are provided suitable through holes, and specifically two outer through holes 42 and two inner through holes 43. Through holes 42 will have a diameter sufficient to permit passage of the extremities of corresponding moving wires F which, as described below, will be wound on winding member 4 during the tensioning operation, and the inner through holes will have a diameter sufficient to permit the shank 51 of said immobilizing hook 5 to be inserted freely therein. It is pointed out that in practice outer holes 42 and inner holes 43 will be the same diameter, and above-mentioned winding member 4 may instead of being obtained from a hexagonal section, also be obtained from a round metal bar of suitable dimensions, in which case it will be necessary to consider the use of different operating systems and/or means. Finally, as may be clearly seen from FIG. 3, said immobilizing member 5 comprises a single piece of metal wire shaped in such a way as to form a straight length 51, which is bent back at one extremity to form a hook-shaped part 52.

After the detailed description of the composition and conformation of the individual members making up the wire tensioner (T), their assembly and the operation of the resulting device (T) will be described summarily.

The two hooking members 2 and 3 are first inserted into helical spring 1 causing them to penetrate opposite each other. Clearly when inserted, corresponding curved members 23 and 36 will hook onto corresponding terminal turns located at the opposite extremities of helical spring 1. Winding member 4 is then inserted-into the resulting space (or slots) between straight lengths 32, 33 and part of straight lengths 35 of second hooking member 3, also causing semi-circular lengths 34 of that second hooking member 3 to penetrate within the two annular grooves 41. The entire device (T) is then complete and ready for use, when it is arranged as illustrated in FIG. 1.

In practice, the unit of turns 21 of device T is first placed onto a corresponding end post PE of a vine support in a known way and then the extremities of the two moving wires F are inserted into the two outer through holes 42 of corresponding winding member 4. At this point winding member 4 is caused to rotate through use of a suitable tool, such as a suitable key, so that moving wires F are progressively wound thereon and consequently will be progressively tensioned if they are secured at the opposite extremity. Once the desired tension has been achieved, which can be advantageously and very easily evaluated merely by checking the shortening of helical spring 1, the operator will secure the whole by inserting straight length 51 of said immobilizing member 5 into one of inner through holes 43 provided in winding member 4 and positioning corresponding hook part 52 on a corresponding part of one of the straight lengths 33 of second hooking member 3.

Clearly the tension which it is desired to impart may vary widely, and for normal uses with the application of two normal devices T at the extremity of a support, as illustrated in FIG. 1, the maximum tension which it is desirable to apply may cause shortening of the two corresponding helical springs 1 which is less than 50% of the maximum amount of shortening which the latter can undergo, that is the value beyond which there would be irreversible damage to the structure of the support, although as said helical spring 1 in device T according to this invention works in compression it can never undergo permanent deformation (overstretching).

The appreciable advantages which the device comprising the resiliently compensated wire tensioner according to this invention can achieve are clear. Firstly, as mentioned above, any accidental, even large overloads, will be supported without causing irreversible damage to either the structure of the support or the spring of the device, which instead, as is known and has already been mentioned, frequently occurs in arrangements using springs working under tension. Both the cost of the damping device, that is the spring operating under tension, and the time and corresponding cost of the corresponding replacement operation are thus avoided. In addition to this already significant advantage, use of the new device simplifies and eases the operation of moving the moving wires in a truly substantial way, in fact in order to perform that operation it is no longer necessary to employ at least two or often even more persons on each occasion before unhooking the ends of the moving wires in order to allow another person or more often other persons to perform the necessary repositioning and then proceed with retensioning the moving wires after repositioning.

With the new device one person can very easily carry out the desired movements without requiring the assistance of any other persons, unless in certain circumstances it is useful or necessary to change the position of these moving wires in order to unhook and retension the same, a single person will always be capable of carrying out everything in a very simple way and practically without effort by acting on winding member 4. There is therefore not only the advantage of reducing the personnel which has to be used for these operations, but also that of simplifying them, speeding them up and making them possible virtually without effort, which obviously also brings about a consequent further appreciable economic advantage.

It is desirable to point out that, in particular, the system for hooking device T to the corresponding end post PE described above may vary widely in both form and manner and in the means of application. Instead of the system described and illustrated which provides for formation of the two turns 21 mentioned, other possible equivalent variant hooking systems may obviously be provided. A suitable metal band having various shapes and dimensions corresponding to the shape and dimensions of the part of the post to which it is wished to apply, such device T may for example be used. In this case the band in question will also be provided with suitable fixing means. Another possible variant may consist of dividing the entire device T into two parts, the first part comprising helical spring 1 and a second part comprising only winding member 4. These two parts separated in this way may be secured to corresponding posts PE at the opposite extremities of a corresponding support with suitable means such as, in particular for the part comprising helical spring 1, a component identical to hooking member 2 referred to in the description or, as stated above, hooking systems equivalent to this and essentially for securing only the tensioner comprising winding member 4. In this possible variant the pair of moving wires F will be fixed to winding member 4 (or equivalent) at one end and. to a hooking member similar to second hooking member 3 referred to in the description at the other. Clearly, the new hooking member will be modified in comparison with hooking member 3 only in the part relating to the attachment of the two ends of the pair of moving wires F, the remainder always behaving in such a way that helical spring 1 only works under compression. In addition to this it will be possible to vary members 2 and 3 in such a way that when inserted into spring 1 they project with small eyelets for attaching moving wires F thereto (2-3) without these (2-3) being provided with tensioning members 4, etc., which will be fitted in conventional ways.

It must also be understood that further variants may be applied to the device comprising the resiliently compensated wire tensioner to which this invention relates without thereby going beyond the scope of what has been described and claimed below with reference to the appended drawings and therefore the scope of the protection of this industrial invention.

The invention claimed is:

1. A resilient wire tensioner for tensioning wires of vine supports, the vine supports including a post, said resiliently wire tensioner comprising:

a first hooking member having a first portion and a second portion, and configured to be secured to the post of the vine supports;

a second hooking member having slots;

a helical spring extending in a longitudinal direction and located between said first portion of said hooking member and said slots of said second hooking member, and wherein said second portion of said first hooking member and a portion of said second hooking member are located within said helical spring;

a winding member rotatably received by said slots, said winding member extending transversally relative to the longitudinal direction of said helical spring and configured to enable adjustable tensioning of the wires of the vine supports; and an immobilizing member configured to couple to said winding member and said second hooking member to prevent rotation of said winding member.

2. A resilient wire tensioner according to claim 1, wherein said winding member is bar-shaped.

3. A resilient wire tensioner according to claim 2, wherein said bar-shaped winding member has a hexagonal cross-section.

4. A resilient wire tensioner according to claim 1, wherein said winding member includes first and second grooves and said slots comprise first and second semicircular lengths, said first and second semicircular length received in said first and second grooves, respectively.

5. A resilient wire tensioner according to claim 1, wherein said winding member includes first and second outer holes configured to receive the tensioning wires, and at least one inner hole configured to receive said immobilizing member.

6. A resilient wire tensioner according to claim 5, wherein said immobilizing member includes a straight portion configured to be inserted into said at least one inner hole and a hook portion configured to couple to said second hooking member.

* * * * *